United States Patent [19]

Sternbach et al.

[11] 3,873,525

[45] Mar. 25, 1975

[54] PREPARATION OF 1-ALKYL-1,4-BENZODIAZEPIN-2-ONES

[75] Inventors: Leo Henryk Sternbach, Upper Montclair; Robert Ye-Fong Ning, West Caldwell, both of N.J.

[73] Assignee: Hoffmann-La Roche Inc., Nutley, N.J.

[22] Filed: Aug. 29, 1973

[21] Appl. No.: 392,598

[52] U.S. Cl. .... 260/239.3 D, 260/239 BD, 260/999
[51] Int. Cl.............................................. C07d 53/06
[58] Field of Search .............. 260/239.3 D, 239 BD

[56] References Cited
UNITED STATES PATENTS
3,481,921  12/1969  Field et al. .................. 260/239 BD

*Primary Examiner*—Henry R. Jiles
*Assistant Examiner*—Robert T. Bond
*Attorney, Agent, or Firm*—Samuel L. Welt; Bernard S. Leon; Frank P. Hoffman

[57] ABSTRACT

A process for preparing 1-alkyl-1,4-benzodiazepin-2-ones via the oxidation of the corresponding benzodiazepine, substituted in the 2-position with a cyano, carboxamido, carboxyl, or lower alkoxycarbonyl group, is disclosed. The products obtainable by this process are known compounds and are useful as sedative, muscle relaxant and anti-convulsant agents.

1 Claim, No Drawings

PREPARATION OF 1-ALKYL-1,4-BENZODIAZEPIN-2-ONES

DESCRIPTION OF THE INVENTION

The present invention relates to a process for preparing known and pharmacologically valuable benzodiazepine derivatives. More particularly, the present invention is concerned with the preparation of 1-alkyl-1,4-benzodiazepin-2-ones. The end products obtained in employing the inventive process are useful as sedative muscle relaxant and anti-convulsant agents.

Following the process of the present invention, one can prepare 1-alkyl-1,4-benzodiazepin-2-ones of the formula

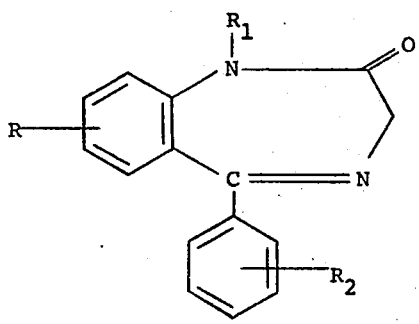

I wherein R signifies hydrogen, halogen, nitro, or trifluoromethyl, $R_1$ signifies lower alkyl and $R_2$ signifies hydrogen or halogen.

As used throughout this disclosure, the term "lower alkyl" either alone or in combination refers to straight and branched chain hydrocarbon groups containing from 1 to 7, preferably from 1–4 carbon atoms, such as, for example, methyl, ethyl, propyl, isopropyl, isobutyl, butyl and the like. The term "halogen" refers to all four forms thereof, i.e. bromine, chlorine, fluorine and iodine. The term "lower alkoxy" designates straight or branched chain saturated hydrocarbonoxy groups containing from 1 to 7 carbon atoms, preferably from 1 to 4 carbon atoms, such as methoxy, ethoxy, propoxy and the like.

In following the novel process of the present invention, the known and useful compounds of formula I above are prepared by oxidizing a compound of the formula

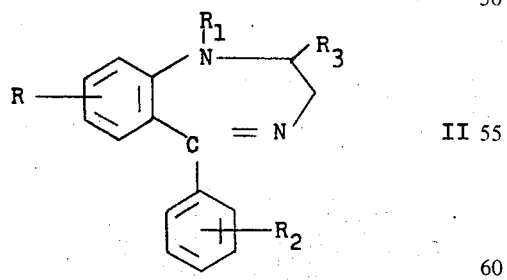

II wherein $R_3$ is selected from the group consisting of cyano, aminocarbonyl, carboxyl and lower alkoxycarbonyl and R, $R_1$ and $R_2$ are as described above.

In a preferred aspect of the present invention, R in the starting material of formula II is halogen, $R_2$ is hydrogen or halogen located at the ortho position of the 5-phenyl ring, and $R_1$ is a lower alkyl group containing from 1 to 4 carbon atoms. In a more preferred aspect, the R substituent in the starting material of formula II is halogen, preferably chlorine, and is located at the 7-position of the benzodiazepine moiety, $R_1$ is methyl and $R_2$ is hydrogen so that by following the novel process aspect of the present invention there is obtained a compound of the formula

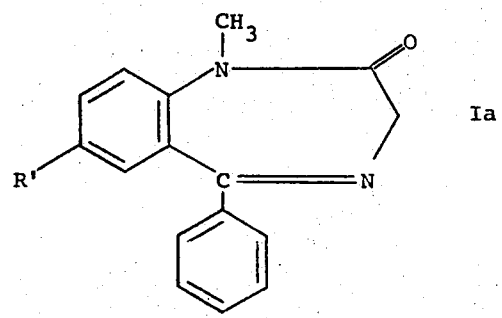

Ia wherein R' signifies halogen.

In another preferred aspect, if the $R_2$ substituent is halogen, it is preferably a chlorine or fluorine group.

As discussed above, the compounds of formula I are prepared by oxidizing the corresponding 1,4-benzodiazepine of formula II bearing in the 2-position a cyano, carboxamido, carboxyl or lower alkoxycarbonyl group. This oxidation is accomplished by treating the benzodiazepine starting material of formula II with a suitable reagent that will generate in situ the chromate or permanganate ion. Thus, suitable oxidizing agents include alkali metal permanganates, preferably potassium permanganate, chromium trioxide in aqueous acetic acid, and chromic acid. This oxidation is preferably effected in the presence of a solvent system that will solubilize the substrate. Suitable systems include water in combination with an inert organic solvent such as acetone or a lower alkanoic acid, such as acetic acid. It is also possible to dissolve the benzodiazepine starting material of formula II in a dilute mineral acid, such as hydrochloric acid, before treating this compound with the selected oxidizing agent. Temperature is not critical to this process aspect and consequently the oxidation reaction is preferably effected at room temperature.

The starting materials of formula II above are prepared following a variety of synthetic approaches. For example, the compound of formula II wherein $R_3$ signifies cyano may be prepared by the cyanation of the corresponding 1-lower alkyl-2-hydroxy-1,4-benzodiazepine of the formula

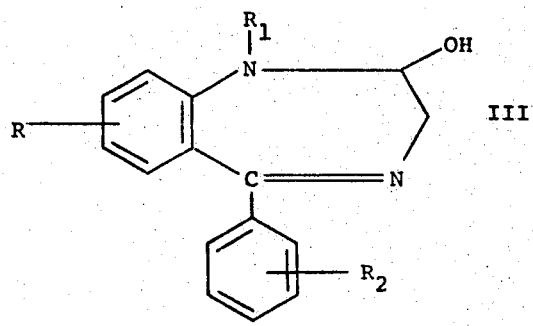

III wherein R, $R_1$ and $R_2$ are as described above.

The conversion of the compound of formula III to the 2-cyano derivative of formula II may be accomplished by treating said compound with any reagent that generates HCN in the reaction mixture. Thus, the compound of formula III may be treated with an aqueous mixture of an alkali metal cyanide such as potassium cyanide or sodium cyanaide, and glacial acetic acid in a suitable solvent. Suitable solvents for this purpose include inert organic solvents such as ethers, for example, tetrahydrofuran; dioxane; halogenated hydrocarbons such as methylene chloride, chloroform and the like. Temperature is not critical to this process aspect and consequently this cyanation reaction is preferably effected at room temperature.

Alternatively, the 2-hydroxy compound of formula III can be converted to the compound of formula II wherein $R_3$ signifies a cyano group, by reacting the 2-hydroxy compound with a cyanohydrin, for example, acetone cyanohydrin. In this reaction, the cyanohydrin reagent also serves as the solvent system and the reaction is expediently effected at elevated temperatures, preferably at a temperature in the range of from about 80°–100°C. Since, as indicated above, the cyanation of the 2-hydroxy compound is accomplished by a reagent that generates HCN in the reaction medium, the conversion of the compound of formula III to the 2-cyano derivative of formula II can also be accomplished by adding HCN to a solution of the formula III compound.

The so-obtained compound of formula II wherein $R_3$ signifies cyano can then be used as the starting material for the corresponding compound of formula II wherein $R_3$ signifies aminocarbonyl. The conversion of the cyano group to the aminocarbonyl group can be accomplished by treating the 2-cyano compound with either an acid or a base. If this conversion is effected by acid treatment of the 2-cyano derivative, the acid employed to effect this conversion is an aqueous mineral acid, such as hydrochloric acid or sulfuric acid. It is preferred that the concentration of the acid reagent be between 5 and 15 N. In this case, the aqueous mineral acid reagent also serves as the solvent system. This reaction is preferably effected at elevated temperatures, most preferably by heating the reaction medium at about 100°C.

As indicated above, the conversion of the 2-cyano derivative to the corresponding 2-aminocarbonyl derivative can also be effected by treating the 2-cyano compound with a base. Suitable bases for this purpose include alkali metal hydroxides such as sodium hydroxide and potassium hydroxide. This reaction is preferably effected in the presence of an inert organic solvent. Suitable solvents include lower alkanols such as methanol, ethanol, propanol and the like and ethylene glycol. It is expedient to effect this reaction at elevated temperatures, preferably by heating the reaction medium at about 100°C.

The 2-cyano-benzodiazepine derivative of formula II prepared as described above can also serve as the starting material for the preparation of the compound of formula II wherein $R_3$ signifies a carboxyl group. The conversion of the 2-cyano group to the 2-carboxyl group is effected by treating the starting material with an aqueous mineral acid, such as concentrated hydrochloric acid, employing reaction conditions more vigorous than those employed in the preparation of the aminocarbonyl derivative. For example, the acid treatment of the 2-cyano compound can be conducted at elevated temperatures using increased reaction times in order to facilitate conversion of the cyano group to the carboxyl group.

The so-obtained compound of formula II bearing a carboxyl group in the 2-position can then be esterified using standard esterification techniques, for example, by treating said compound with a lower alkanol, i.e., methanol or ethanol, in a mineral acid, to yield the corresponding benzodiazepine bearing a lower alkoxycarbonyl group in the 2-position. Suitable mineral acids for this purpose include hydrogen chloride and sulfuric acid.

The following examples are illustrative of the present invention. All temperatures are given in degrees Centigrade.

EXAMPLE 1

Preparation of 7-chloro-2-cyano-2,3-dihydro-1-methyl-5-phenyl-1H-1,4-benzodiazepine.

A solution of 2.50 g of 7-chloro-2,3-dihydro-2-hydroxy-1-methyl-5-phenyl-1H-1,4-benzodiazepine in 16 ml of acetone cyanohydrin was heated on a steam bath for 20 min. The solution was concentrated (water aspirator, 70°–90°, 15 min) to near dryness. The residual gum was purified by preparative thin-layer chromatography (twenty 20 cm × 20 cm × 2 mm silica gel plates) using benzene containing 10% by volume of ether as eluent. The major product (Rf 0.25) was isolated as 1.60 g of a yellow gum which solidified on standing. Recrystallization from methanol afforded the above-named product as yellow prisms, mp 120°–122°.

EXAMPLE 2

Preparation of 7-chloro-2-cyano-2,3-dihydro-5-(2-fluoro-phenyl)-1-methyl-1H-1,4-benzodiazepine.

A suspension of 0.65 g (2.1 mmoles) of 7-chloro-2,3-dihydro-5-(2-fluorophenyl)-2-hydroxy-1-methyl-1H-1,4-benzodiazepine in 3 ml of acetone cyanohydrin was heated on a steam bath until a maroon solution formed (5 min). The solution was concentrated to near dryness (water aspirator, 70°–90°, 15 min). The residual gum was purified by preparative thin-layer chromatography (seven 20 cm × 20 cm × 2 mm silica gel plates) using benzene containing 10 percent by volume of ether as eluent. The major product (Rf 0.25, appearing colorless and fluorescent on silica gel) was isolated as a light yellow gum. Crystallization of this gum by allowing the solution in methanol to evaporate slowly afforded the abovenamed product as colorless prisms, mp 124°–125°.

EXAMPLE 3

Preparation of 2-carbamoyl-7-chloro-2,3-dihydro-1-methyl-5-phenyl-1H-1,4-benzodiazepine.

A mixture of 1.50 g (5.0 mmole) of 7-chloro-2-cyano-2,3-dihydro-1-methyl-5-phenyl-1H-1,4-benzodiazepine and 7.0 ml of concentrated hydrochloric acid was heated on a steam bath for 0.50 hr.

The solution was poured into 100 ml of ice water in which was dissolved 10.60 g of sodium carbonate. The desired product was extracted into methylene chloride. The methylene chloride layer was dried over anhydrous sodium sulfate and evaporated to dryness. The residual oil on crystallization from ether yielded the above-named product as a light yellow amorphous solid, mp 202°–204°.

An analytical sample was prepared by recrystallization from methanol to yield light yellow prisms, mp 204°–206°.

EXAMPLE 4

Preparation of 7-chloro-1,3-dihydro-1-methyl-5-phenyl-2H-1,4-benzodiazepine 2-carboxylic acid hydrochloride.

A mixture of 2.00 g (6.80 mmole) of 7-chloro-2-cyano-2,3-dihydro-1-methyl-5-phenyl-3H-1,4-benzodiazepine and 65.0 ml of concentrated hydrochloric acid was heated to reflux for 16 hrs. On cooling the desired hydrochloride salt crystallized from solution. It was collected by filtration and washed with concentrated hydrochloric acid. After drying in vacuo at 100°C for 4 hr, the above-named product was obtained as orange prisms, mp 247°–249°.

EXAMPLE 5

Preparation of 7-chloro-1,3-dihydro-1-methyl-5-phenyl-2H-1,4-benzodiazepin-2-one.

A solution of 150 mg (0.50 mmole) of 2-cyano-7-chloro-2,3-dihydro-1-methyl-5-phenyl-1H-1,4-benzodiazepine in 3.0 ml of 3 N hydrochloric acid was added to a solution of 158 mg (1.00 mmole) of potassium permanganate in 5.0 ml of water. This mixture was kept at room temperature for 1 hr. Sulfur dioxide was bubbled through the mixture. The clear solution was neutralized with saturated sodium bicarbonate and then extracted with methylene chloride. The methylene chloride layer was dried over anhydrous sodium sulfate then evaporated to dryness. The residual oil on crystallization from acetone-petroleum ether yielded the above-named product as a light yellow amorphous solid, mp 116°–120°.

EXAMPLE 6

Preparation of 7-chloro-1,3-dihydro-1-methyl-5-phenyl-2H-1,4-benzodiazepin-2-one.

A mixture of 351 mg (1.0 mmole) of 7-chloro-2,3-dihydro-1-methyl-5-phenyl-2H-1,4-benzodiazepine-2-carboxylic acid hydrochloride, 800 mg (5.0 mmole) of potassium permanganate and 5.0 ml of water was kept at room temperature for 1 hr. Sulfur dioxide was bubbled through the mixture. The clear solution was neutralized with saturated aqueous sodium bicarbonate and then extracted with methylene chloride. The methylene chloride layer was dried over anhydrous sodium sulfate then evaporated to dryness. The residual oil (160 mg) was fractionated by preparative thin-layer chromatography (two 20 cm × 20 cm × 2 mm silica gel plates, developed in ethyl acetate). The above-nmaed product was isolated with the help of reference material, first as an oil (60 mg) which then on crystallization from acetone-petroleum ether afforded the product as an amorphous solid, mp 122°–124°.

EXAMPLE 7

Preparation of 7-chloro-1,3-dihydro-1-methyl-5-phenyl-2H-1,4-benzodiazepin-2-one.

To a solution of about 2 mg of 2-carbamoyl-7-chloro-2,3-dihydro-1-methyl-5-phenyl-1H-1,4-benzodiazepine in 1.0 ml of acetone was added an excess of chromic acid. The mixture was kept at room temperature for 15 min. An aliquot was removed, neutralized with aqueous sodium bicarbonate, then extracted into methylene chloride. The methylene chloride solution was spotted on a tlc plate. After development in ethyl acetate, the chromatograms indicated the presence of the above-named product, ($Rf = 0.63$).

EXAMPLE 8

In analogy to the procedures set forth in Example 7 above, 7-chloro-1,3-dihydro-1-methyl-5-phenyl-2H-1,4-benzodiazepin-2-one can be prepared by the chromic acid oxidation of 2-cyano-7-chloro-2,3-dihydro-1-methyl-5-phenyl-1H-1,4-benzodiazepine.

EXAMPLE 9

Preparation of 7-chloro-1,3-dihydro-1-methyl-5-phenyl-2H-1,4-benzodiazepine-2-carboxylic acid methyl ester hydrochloride.

A solution of 350 mg (1.0 mmole) of 7-chloro-1,3-dihydro-1-methyl-5-phenyl-2H-1,4-benzodiazepine-2-carboxylic acid hydrochloride in 10 ml of methanol was chilled in a dry ice bath and a slow stream of anhydrous hydrogen chloride gas was bubbled through the solution for 0.5 hr. The solution was allowed to stand at room temperature overnight. The residue from the evaporation of the reaction mixture was dissolved in methylene chloride and washed with saturated sodium bicarbonate. The methylene chloride layer was dried over anhydrous sodium sulfate then evaporated to dryness. The residual oil was dissolved in 2.0 ml of benzene and filtered through a small pad of alumina. The pad was washed with 20 ml of ethyl acetate. Ethyl acetate was evaporated. The residue was dissolved in methanolic hydrochloric acid (1.5 N) then evaporated to dryness. The residue was slurried with ether to yield the above-named product as a light yellow amorphous solid, mp 212°–214°.

EXAMPLE 10

In analogy to the procedures set forth in Example 7 above, 7-chloro-1,3-dihydro-1-methyl-5-phenyl-2H-1,4-benzodiazepin-2-one can be prepared by the chromic acid oxidation of 7-chloro-1,3-dihydro-1-methyl-5-phenyl-2H-1,4-benzodiazepine-2-carboxylic acid methyl ester hydrochloride.

We claim:

1. A process for preparing a compound of the formula

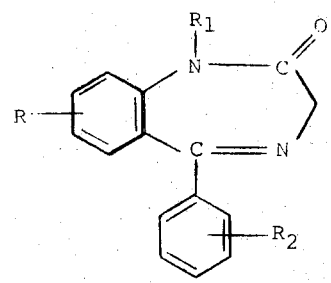

wherein R signifies hydrogen, halogen, nitro, or trifluoromethyl, $R_1$ signifies lower alkyl and $R_2$ signifies hydrogen or halogen comprising oxidizing a compound of the formula

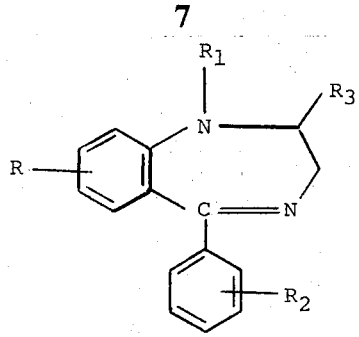
wherein R, $R_1$ and $R_2$ are as described above and $R_3$ is selected from the group consisting of cyano, carboxamido, carboxyl, and lower alkoxy-carbonyl with an oxidizing agent selected from the group consisting of alkali metal permanganates, chromic acid and chromium trioxide in aqueous acetic acid.
* * * * *